(No Model.)

T. GARE.
JOURNAL BOX.

No. 425,569. Patented Apr. 15, 1890.

Witnesses.
Thos. A. Foulkes.
B. A. Cooper.

Inventor.
Thomas Gare
by. Ferdinand Bosshardt.
Attorney.

UNITED STATES PATENT OFFICE.

THOMAS GARE, OF STOCKPORT, COUNTY OF CHESTER, ENGLAND.

JOURNAL-BOX.

SPECIFICATION forming part of Letters Patent No. 425,569, dated April 15, 1890.

Application filed June 18, 1889. Serial No. 314,762. (No model.) Patented in England November 3, 1887, No. 14,984.

*To all whom it may concern:*

Be it known that I, THOMAS GARE, engineer, a subject of the Queen of Great Britain, and residing at Stockport, in the county of Chester, have invented a new and useful Improvement in Journal-Box Bushes and Bearings Employed for Holding Shafts Revolving in a Horizontal or other Position, (for which I have obtained a patent in Great Britain, No. 14,984, dated November 3, 1887,) of which the following is a specification.

My invention relates to improvements in bushes and bearings, and is of general applicability for holding shafts revolving in a horizontal or other position; and the objects of my improvements are, first, to produce a bearing the bush of which can be readily contracted or expanded cylindrically by suitably subjecting or freeing it from external pressure, so as to compensate for the interior wear of the bush and to insure always a proper fit; secondly, to afford facilities for the bush and bearing to contain a large amount of lubricant, which supplies itself gradually, automatically, and uniformly to the interior of the bush and to the shaft. I attain these objects by the mechanism illustrated in the accompanying drawings, in which—

Figure 1:
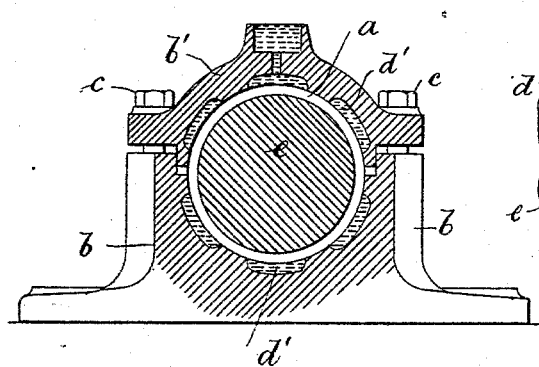
Figure 2:
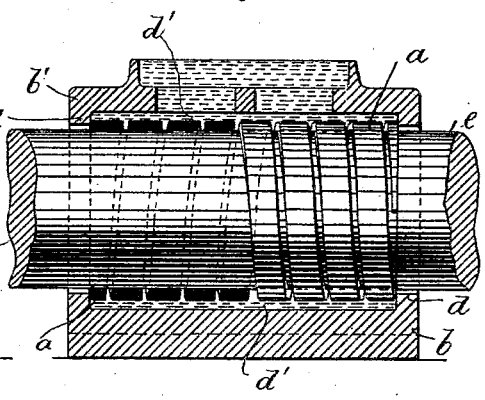
Figure 5:
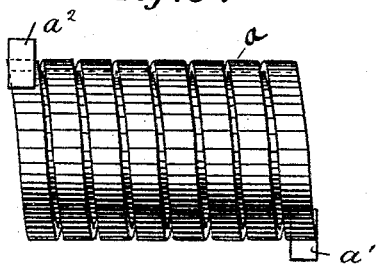
Figure 3:
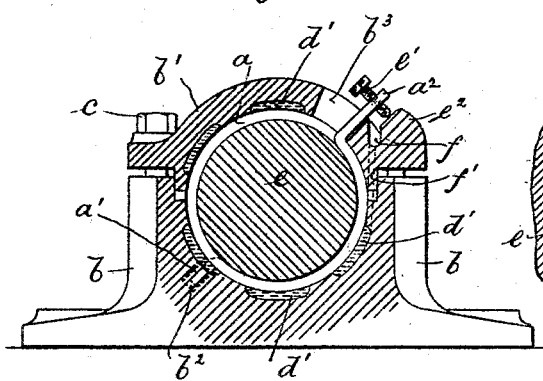
Figure 4:
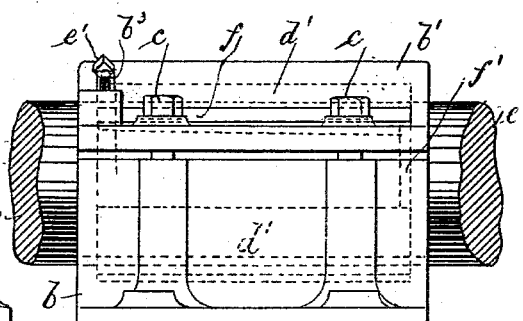

Figure 1 is a sectional end view of the bush and bearing. Fig. 2 is a longitudinal section of the bearing, showing the bush partly in section and partly in view. Fig. 3 is a sectional end view, and Fig. 4 a side elevation, of the bearing and bush, showing a modification of my invention; and Fig. 5 is a side elevation of the bush detached.

Similar letters refer to similar parts throughout the several views.

In carrying out my invention and referring to the figures generally I suitably wind or coil a metal bar of suitable section, preferably flat or square, so as to form a hollow cylindrical body $a$ of suitable length and diameter and to leave a little space between the coils to serve for the supply of lubricant to the shaft. This hollow cylindrical body $a$, which forms the bush in one form of my invention, I fit loosely into the bearing $b$, (see Fig. 1,) which, as usual, is furnished with a cap $b'$ in such a manner that when pressure is exerted onto the bush $a$ by means of the bolts $c$ and cap $b'$ it will be prevented from revolving and will contract cylindrically, so as to permit of compensating for the wear that takes place from time to time, the bush $a$ being held in position longitudinally by means of the flanges $d$, formed at each end of the bearing and cap $b$ and $b'$.

In order to insure a proper fit of the bush $a$ when new without applying pressure thereon, I make the interior diameter a little less than the diameter of the shaft $e$, to which it will be applied.

On the sides of the bush $a$ one or more cavities $d'$ are formed in the bearing $b$ $b'$, which serve as receptacles for the lubricant, whence it supplies itself to the interior of the bush $a$ by passing between the coils of the same.

In cases where the bore of the bearing is not quite true, and consequently the pressure exerted on the cap $b'$ not divided uniformly or to excess on the bush $a$, I form each end of the same (see Figs. 3 and 5) with an arm $a'$ and $a^2$, the arm $a'$ being fitted into a cavity $b^2$, formed in the bottom part $b$, and the arm $a^2$ being arranged to project through a slot $b^3$, formed in the cap $b'$ of the bearing $b$. This arm $a^2$ is furnished with a set-screw $e'$, resting on a projection $e^2$, formed on the cap $b'$, by means of which the bush $a$ can be contracted or expanded, as required, to insure the necessary fit, and in order that the lubricant will always be divided uniformly over the whole length of the bush $a$, a slightly-inclined channel $f$ may be formed in the cap $b'$, one end of which leads to the slot $b^3$ and the other end to a part $f'$, leading to the cavities $d'$, which channel $f$ serves to conduct the lubricant, which works itself through the slot $b^3$ back to the opposite end into the bearing $b$.

The coils of the bush $a$ may be wound more or less apart from each other and the space between thus formed filled up with plumbago or other lubricant in a consistent state.

Having now particularly described my invention, and in what manner the same is to be performed, I declare that what I claim is—

The combination of a bush $a$, consisting of a metal bar coiled cylindrically and capable of expansion and contraction when subjected to or freed from external pressure, with a bearing $b\ b'$, the bore of which is formed with cavities $d$, which are in communication with the exterior of the bush $a$, and, in conjunction with the coil-spaces, serve to hold lubricant, substantially as and for the purpose specified.

THOMAS GARE.

Witnesses:
FERDINAND BOSSHORRDT,
THOS. A. FOULKES.